(12) United States Patent
Herberg et al.

(10) Patent No.: US 9,932,548 B2
(45) Date of Patent: Apr. 3, 2018

(54) SYSTEM AND METHOD FOR FILTERING BEVERAGES

(75) Inventors: Wolf-Dietrich Herberg, Witten (DE); Reimar Gutte, Kirchberg (CH)

(73) Assignee: GEA Mechanical Equipment GmbH, Oelde (DE)

(*) Notice: Subject to any disclaimer, the term of this patent is extended or adjusted under 35 U.S.C. 154(b) by 636 days.

(21) Appl. No.: 13/577,365

(22) PCT Filed: Mar. 10, 2011

(86) PCT No.: PCT/EP2011/053591
§ 371 (c)(1),
(2), (4) Date: Apr. 11, 2013

(87) PCT Pub. No.: WO2011/113738
PCT Pub. Date: Sep. 22, 2011

(65) Prior Publication Data
US 2013/0193089 A1  Aug. 1, 2013

(30) Foreign Application Priority Data

Mar. 18, 2010 (DE) .................. 10 2010 011 932

(51) Int. Cl.
| | |
|---|---|
| *C12G 3/08* | (2006.01) |
| *C12H 1/07* | (2006.01) |
| *B01D 61/14* | (2006.01) |
| *A23L 2/74* | (2006.01) |
| *A23L 2/08* | (2006.01) |
| *B01D 63/06* | (2006.01) |

(52) U.S. Cl.
CPC .............. *C12G 3/08* (2013.01); *A23L 2/082* (2013.01); *A23L 2/74* (2013.01); *B01D 61/142* (2013.01);
(Continued)

(58) Field of Classification Search
CPC .. C12G 3/08; C12G 3/00; C12G 3/085; A23L 2/082; A23L 2/08; A23L 2/02;
(Continued)

(56) References Cited

U.S. PATENT DOCUMENTS 4,844,932 A * 7/1989 Daoud ........................ 426/489
5,076,931 A   12/1991 Müller
(Continued)

FOREIGN PATENT DOCUMENTS

| DE | 34 23 594 | 1/1986 |
|---|---|---|
| DE | 38 07 258 | 9/1989 |

(Continued)

OTHER PUBLICATIONS

German Office Action for Application No. 10 2010 011 932.6-41, dated Mar. 18, 2010.
(Continued)

*Primary Examiner* — David C Mellon
*Assistant Examiner* — Liam Royce
(74) *Attorney, Agent, or Firm* — Crowell & Moring LLP

(57) ABSTRACT

A filtration system for clarifying a cloudy beverage from at least one tank in which dregs have formed, the clarifying occurring through a cross-flow filtration. The filtration system includes: a first filtration module having a first filtration element, the first filtration element including a first channel having a first diameter; and, a second filtration circuit located in parallel to the first filtration circuit, the second filtration circuit including a second filtration module having a second filtration element, the second filtration element including a second channel having a second diameter, the second diameter being larger than the first diameter. A method for filtering a cloudy beverage from at least one tank in which dregs have formed, the method using the just-described filtration system.

11 Claims, 4 Drawing Sheets

(52) U.S. Cl.
CPC ........... *B01D 63/066* (2013.01); *C12H 1/063* (2013.01); *B01D 2315/10* (2013.01); *B01D 2317/04* (2013.01); *B01D 2317/08* (2013.01); *C12G 3/085* (2013.01)

(58) Field of Classification Search
CPC ..... A23L 2/00; A23L 2/74; A23L 2/72; A23L 2/70; C12H 1/061; C12H 1/06; C12H 1/02; C12H 1/00; B01D 63/066; B01D 63/06; B01D 63/00; B01D 61/142; B01D 61/14; B01D 61/00; B01D 2315/10; B01D 2315/00; B01D 2317/04
USPC ....... 210/806, 767, 323.1, 322, 333.01, 332, 210/340; 426/11, 7, 29, 28, 18, 590, 531
See application file for complete search history.

(56) References Cited

U.S. PATENT DOCUMENTS

| | | | |
|---|---|---|---|
| 5,256,294 A | 10/1993 | van Reis | |
| 5,454,947 A * | 10/1995 | Olapinski | B01D 29/35 210/500.26 |
| 6,017,451 A | 1/2000 | Kopf | |
| 6,951,614 B2 | 10/2005 | Brett et al. | |
| 7,220,358 B2 * | 5/2007 | Schacht et al. | 210/636 |
| 2002/0102287 A1* | 8/2002 | Shanbrom | 424/405 |
| 2006/0090651 A1* | 5/2006 | Liu | B01D 46/0021 96/121 |
| 2012/0125849 A1* | 5/2012 | Lindstrom | B01D 61/147 210/650 |

FOREIGN PATENT DOCUMENTS

| | | | | |
|---|---|---|---|---|
| DE | 101 64 555 | 6/2003 | | |
| EP | 1 757 356 | 2/2007 | | |
| GB | 2159729 A | * 12/1985 | ............ | B01D 53/22 |
| GB | 2341809 A | 3/2000 | | |

OTHER PUBLICATIONS

The Translation of the International Preliminary Report on Patentability of The Written Opinion of the International Searching Authority of PCT/EP2011/053591, filed Mar. 10, 2011.

* cited by examiner a)

b)

SYSTEM AND METHOD FOR FILTERING BEVERAGES

CROSS-REFERENCE TO RELATED APPLICATION

This application is a national stage of International Application PCT/EP2011/053591, filed Mar. 10, 2011, and claims benefit of and priority to German Patent Application No. 10 2010 011 932.6, filed Mar. 18, 2010, the content of which Applications are incorporated by reference herein.

BACKGROUND AND SUMMARY

The present disclosure relates to a system and a method for clarifying beverages, for example, for clarifying wine, by filtration A filtration system for clarifying a cloudy beverage, for example, a cloudy wine. A method for filtering a cloudy beverage from at least one tank in which dregs have formed, the method using the filtration system just-described.

Beverages which are obtained from fruits or grains typically contain turbid materials, which are either provided in colloidal form in the liquid or which settle as dregs in a container.

In the clarification of wine from a fermentation tank, processing the wine separately from the lees, the so-called dregs, in the lower part of the fermentation tank is known.

For example, filtration systems are used for clarifying the wine. The lees or the dregs are processed separately or discarded, since the common filtration systems are capable of and designed for processing the wine, but not for processing the lees or dregs having a much higher proportion of turbid materials in comparison to the wine. It is only sometimes expedient, in very large wine production operations, to provide a separate processing line for clarifying the dregs, in order to still obtain at least a wine of reduced quality from the dregs. This is not expedient for reasons of cost in small wine production operations.

The present disclosure addresses this problem.

The present disclosure addresses the problem via a filtration system having filtration circuits and a method using those filtration circuits.

The present disclosure relates to a filtration system for clarifying a cloudy beverage, for example, a cloudy wine. The filtration system includes a tank, in which dregs have formed, through cross-flow filtration. The filtration system also includes a first filtration circuit having at least one filtration module having at least one or more filtration elements having channels having a first diameter, and a second filtration circuit parallel to the first filtration circuit and having at least one filtration module having at least one or more filtration elements having channels having a second diameter that is larger than the first diameter.

The present disclosure also relates to a method for filtering a cloudy beverage, for example, a cloudy wine, from at least one tank, in which dregs have formed, using a filtration system that includes: a first filtration module having a first filtration element, the first filtration element including a first channel having a first diameter; and a second filtration circuit located in parallel to the first filtration circuit, the second filtration circuit including a second filtration module having a second filtration element, the second filtration element including a second channel having a second diameter, the second diameter being larger than the first diameter. The method includes the steps of: (a) the cloudy beverage is either clarified in the first filtration circuit using the filtration modules having the channels having the smaller diameter and discharged or the cloudy beverage is clarified in parallel in both filtration circuits using the filtration modules having the channels having the smaller diameter and the filtration modules having the larger diameter and discharged; and the remaining unfiltered material from step (a) and/or the dregs of the cloudy beverage is/are then clarified in the second filtration circuit using the filtration modules having the channels having the larger diameter and discharged.

Since, according to the present disclosure, at least one second filtration module is integrated in the filtration system, which has one or more filtration elements, whose through-flow channels have a greater diameter than the filtration elements of the first filtration module, not only can the wine to be processed be clarified in the filtration elements having the channels of smaller diameter, but rather it is within the scope of the present disclosure to filter the unfiltered material and/or dregs, specifically in the filtration modules having the larger channel diameter. This is advantageous because the filtrate obtained in this embodiment is composed such that it can typically still be sold as a wine.

Through the modules having the channels of larger diameter, it is within the scope of the present disclosure to also filter the dregs, which have a substantially greater, or higher, viscosity than the cloudy beverage to be processed. At the end of the filtration, this viscosity of the "pasty" retentate, or unfiltered material remaining during the filtration of the dregs, can, for example, be more than 10 times as great, for example, or up to 30 times as great, as the viscosity of the retentate remaining during the filtration of the wine.

The two filtration modules can jointly use the periphery, for example, pumps or control devices, which must be provided on the filtration system, even for only a single filtration circuit.

The one or more embodiments of the present disclosure provide substantial economic advantages over the provision of a separate system for processing dregs.

In accordance with the present disclosure, for example, valves or side-changing curves, may be advantageously provided for changing over between the first and the second filtration circuit.

Embodiments of the present disclosure are discussed herein as well as in the claims.

Other aspects of the present disclosure will become apparent from the following descriptions when considered in conjunction with the accompanying drawings.

DETAILED DESCRIPTION

Figure 1:
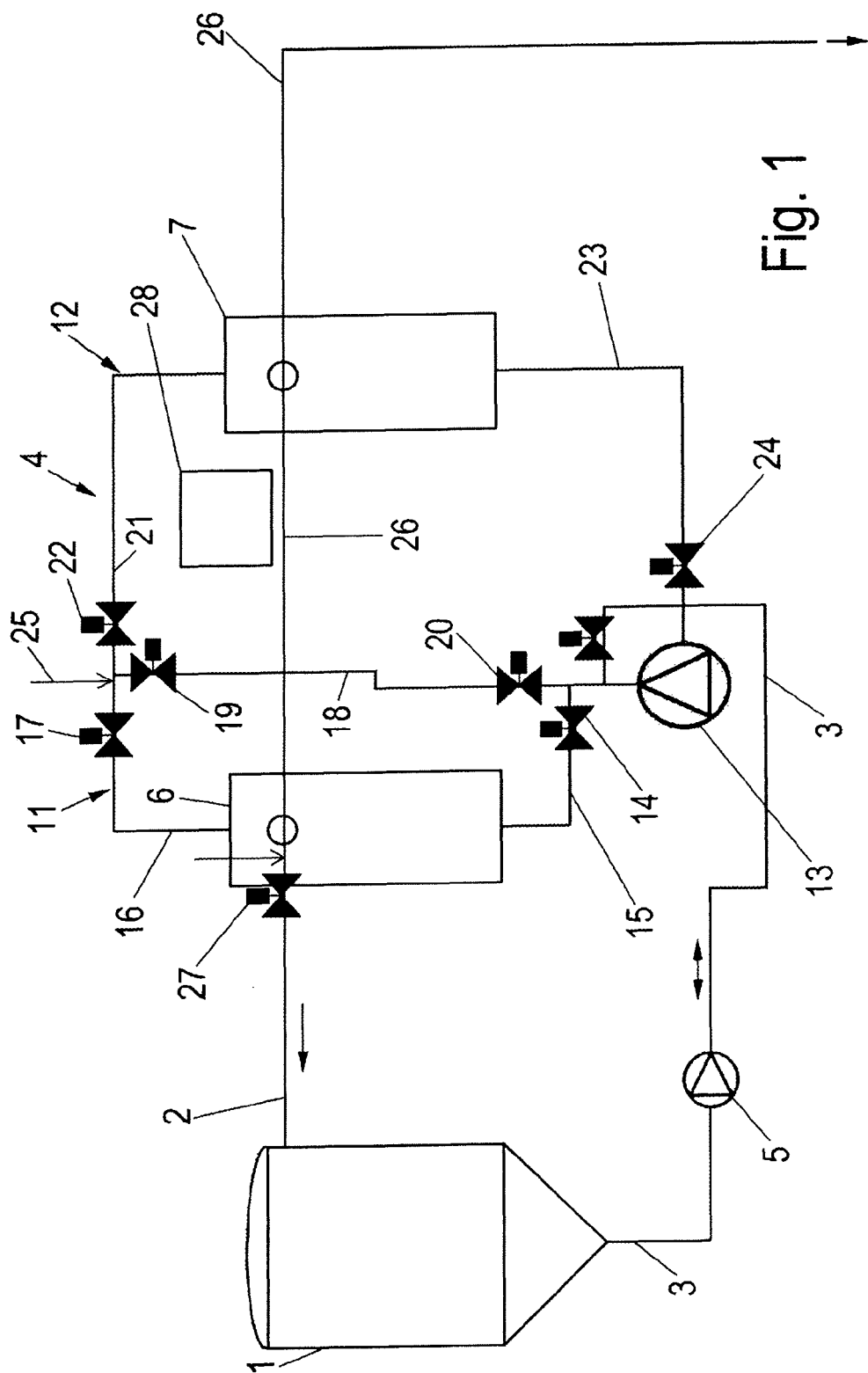
FIG. 1 shows a schematic view of a filtration system for clarifying wine, according to the present disclosure.

FIG. 1 shows a filtration system for clarifying wine through a cross-flow filtration, according to the present disclosure.

The filtration system includes a feed tank 1 connected upstream from the system, which may, for example, have a cylindrical shape in an upper part and a conical shape in a lower part. The suspension to be processed is poured into the feed tank 1, for example, cloudy wine from a tank or dregs from a fermenting tank.

The feed tank 1 is connected via a first line, for example, attached further upward on the feed tank 1, and a second line 3 attached further downward, for example, at the lowermost point of the feed tank 1 having a conical shape in the lower part, to a filtration system 4.

The line 3 is used as a supply line to supply the cloudy wine from the feed tank 1 into the filtration system 4. The upper line 2 is a return line to return filtrate from the filtration system 4 into the feed tank 1, for example, during the cleaning. A feed pump 5 is connected in the line 3, by which the suspension can be conducted into the filtration system 4.

The filtration system has a plurality of filtration modules, for example, two or more filtration modules 6, 7. The filtration modules 6, 7, for example, may have one or more ceramic membrane filtration element(s), which are operated in the cross-flow method.

Figure 2:
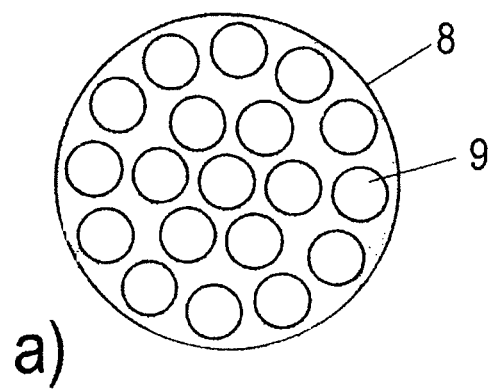
FIGS. 2a) and 2b) show sectional views of two different membrane filter modules, according to the present disclosure.
Figure 2:
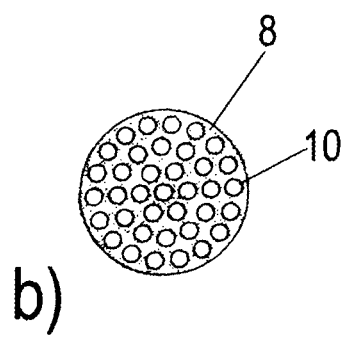

The filtration elements may, for example, each have one or more ceramic bodies 8, as shown, for example, in FIG. 2. The ceramic bodies 8 may, for example, be linear and tubular. They are penetrated by channels 9, 10 for conducting there-through the suspension to be clarified.

The filtration system 4 may include at least two, and shown in FIG. 2 as two, filtration circuits 11, 12. A pump 13, used jointly for both filtration circuits 11, 12, is used to maintain the liquid flow in the two filtration circuits 11, 12.

Suspension flowing out of the supply line 3 first arrives in the pump 13.

Using the pump 13, the suspension is then either conducted into the first filtration circuit 11 or into the second filtration circuit 12 parallel thereto or conducted in parallel into both filtration circuits 11, 12.

The first filtration circuit 11 is formed, for example, by at least elements next identified.

First filtration circuit 11 includes a line 15 having a valve 14, at least one filtration module 6 connected downstream from the line 15, a line 16 having a valve 17, and a line 18 having valves 19, 20, the line 18 in turn being connected to the line 13.

The second filtration circuit 12 is formed, for example, by at least the elements next described.

Second filtration circuit 12 includes a line 18 having the valves 19, 20, a line 21 having a valve 22, one or more of the filtration modules 7, and a line 23 having a valve 24, the line 23 in turn opening into the line 18.

Furthermore, a supply line 25 for a fluid such as a gas is provided, which opens into the line 18. p In addition, a discharge line 26 for the filtrate from the filtration modules 6, 7 is provided. A valve 27 is connected in the discharge line 26. If this valve is opened, the line 26 is connected to the "return" line 2 to the feed tank 1, so that filtrate can be conducted back into the feed tank 1, for example, during a cleaning.

A cleaning device 28 assigned to the discharge line 26 allows the cleaning of the filtration elements.

It is important and within the scope of the present disclosure that at least two different types of filtration elements, for example, ceramic elements, having channels 9, 10 having at least two different diameters are arranged in the two different filtration circuits 11, 12.

The suspension to be clarified flows into the channels 9, 10 along the membrane of ceramic body 8 of the filtration elements, a partial flow passing the membrane 8 as a filtrate and being discharged through the carrier material, or discharge line 26.

The filtration module 7, for example, has one or more of the filtration elements, for example, ceramic elements, having a larger channel diameter, and the filtration module 6, for example, has one or more of the filtration elements, for example, ceramic elements, having a smaller channel diameter.

Only one filtration element having the channels 9 of larger diameter is provided in the filtration module 7 of the circuit 12, while in contrast, the circuit 12 is provided with several, for example, six filtration elements having the channels 10 of smaller diameter. This ratio changes analogously to the size of the filtration system.

The channels 10 of the filtration elements of the first filtration module 6 can have a diameter of less than 23 mm, or, for example, 1-2 mm, or 1.3 mm, for example, as shown in FIG. 2*b*.

The channels 9 of the at least one filtration element of the second filtration module 7, in contrast, can have a diameter of greater than 6 mm, or for example, 8 mm, as shown in FIG. 2*a*.

The function of the filtration system is as follows.

Wine to be clarified is conducted from the feed tank 1 through the supply line 3 and the pump 5 into the pump 13 of the filtration system 4.

The cloudy wine only contains an amount of solids such that it can be clarified in the filtration circuit 11 using the filtration modules 6 having the filtration elements with the channels 10 having the smaller diameter.

The still cloudy wine to be clarified is, therefore, first conducted using the pump 13 into the first membrane filter module 6 via the membrane surface of the channels 10 of the first membrane filter module 6. The wine may, for example, have a relatively low overflow velocity of, for example, approximately 1-4 m/s, or, for example, 2 m/s. The filtrate, that is, the clarified wine, is discharged through the discharge line 26.

To prevent blockage of the membrane pores, the cleaning device 26 is provided, which may be implemented as a back-flushing unit, and which is arranged on the discharge line 26.

It causes the filtrate to be periodically back-flushed, whereby the pores of the membrane surface in the first membrane filter module 6 can be flushed free again.

Depending on the filtering capability of the wine, the filtration process can last a few hours up to several days. Following the filtration, the membrane surface is restored to the starting state by a cleaning.

The filtration circuit 12 having the filtration modules 7 having channels 9 of greater diameter can be used during the emptying of the system using inert gas for the final filtration of the contents of the first filtration circuit 11 having the filtration module 6 having the smaller channel diameter. If valve 17 is closed, the entire contents being pressed into the filtration module 7 and via the membranes therein, an additional quantity of 20 to 30 L of clarified wine, for example, is able to be obtained.

Furthermore, it is within the scope of the present disclosure that, after the clarification of the cloudy wine, to clarify the dregs from the fermentation tank.

For this purpose, the dregs are conducted into the second filtration circuit 12 having the filtration modules 7. The changeover between first and second filtration circuits is performed by a suitable activation or changeover of the valves in the circuits.

The dregs are conducted via the membrane surfaces or through the channels 9 of the filtration module 7 having the channels of larger diameter, that is, through the second filtration circuit 12. The first filtration circuit 11 is closed so that the filtration module 6 does not clog. The filtrate, which arises during this filtration, is discharged through the discharge line 26. It is typically still of sufficiently high quality that it can be sold as a wine or can be processed further. This is a substantial advantage in particular for smaller production operations.

During the clarification of the cloudy wine, not the unfiltered material and/or the dregs, both filtration circuits 11, 12 can also be opened, so that the wine also flows through the filtration module 7. The function of the system is not impaired in this way, but rather is optimized. In contrast, the first filtration circuit 11 is closed during the processing of the unfiltered material, dregs, or the like.

To clean the filtration system, the individual membrane filter modules 6, 7 can be emptied using inert gas after the emptying or shutdown of the system. The liquid remaining in the filtration circuit, which would normally result as dead volume, is conducted in a following process via the second membrane filter module 7.

For example, the use of ceramic membrane filter surfaces suggests itself for the filtration process, since these filtration modules are particularly long-lived.

As an alternative to the concentration on wine dregs and the clarification of wine and within the scope of the present disclosure, cider dregs or other beverages having solid components can also be clarified, or their dregs can be concentrated.

Figure 3:
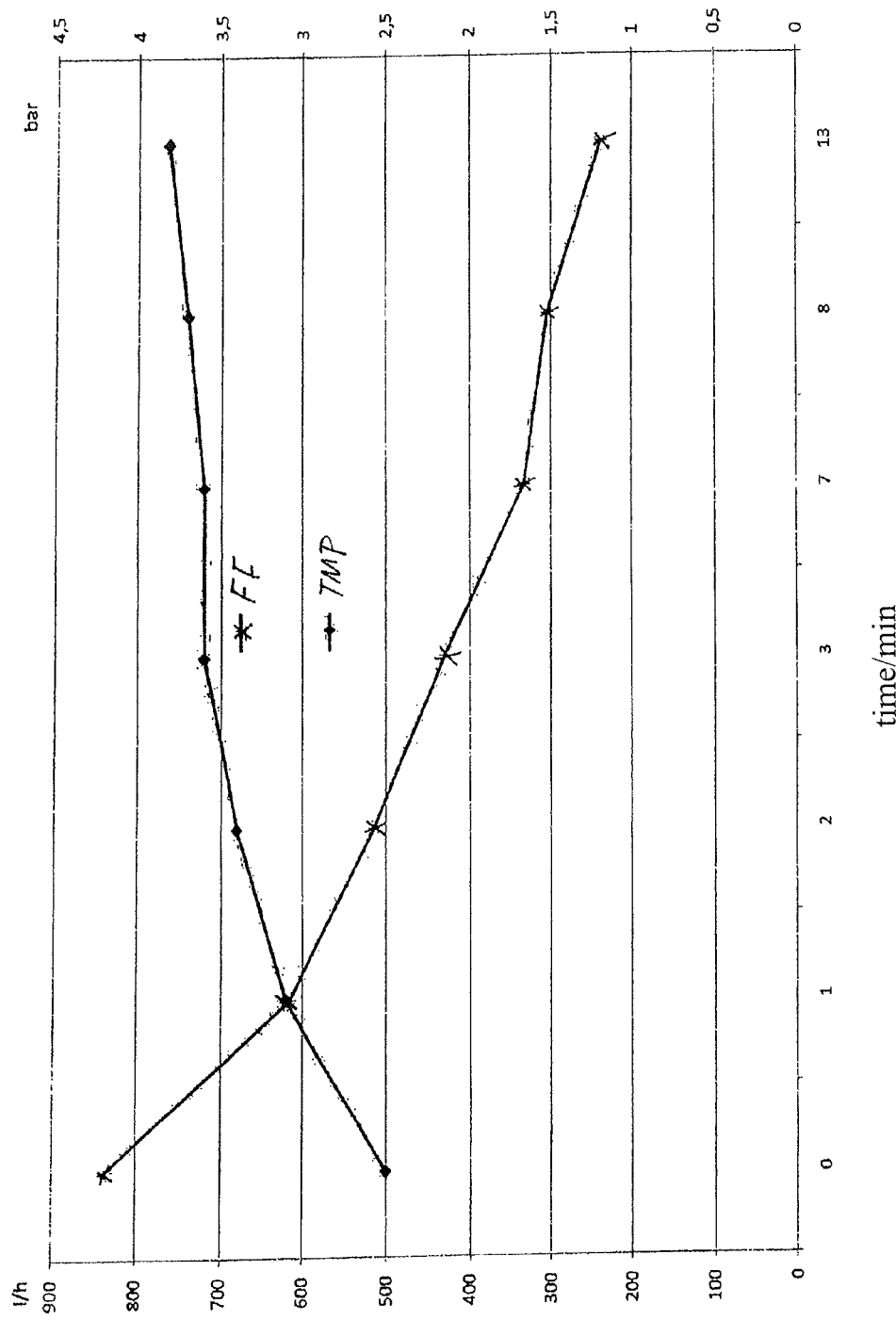
FIG. 3 shows an exemplary time curve of a filtrate flow volume and a transmembrane pressure at an end of a filtration, according to the present disclosure.
Figure 4:
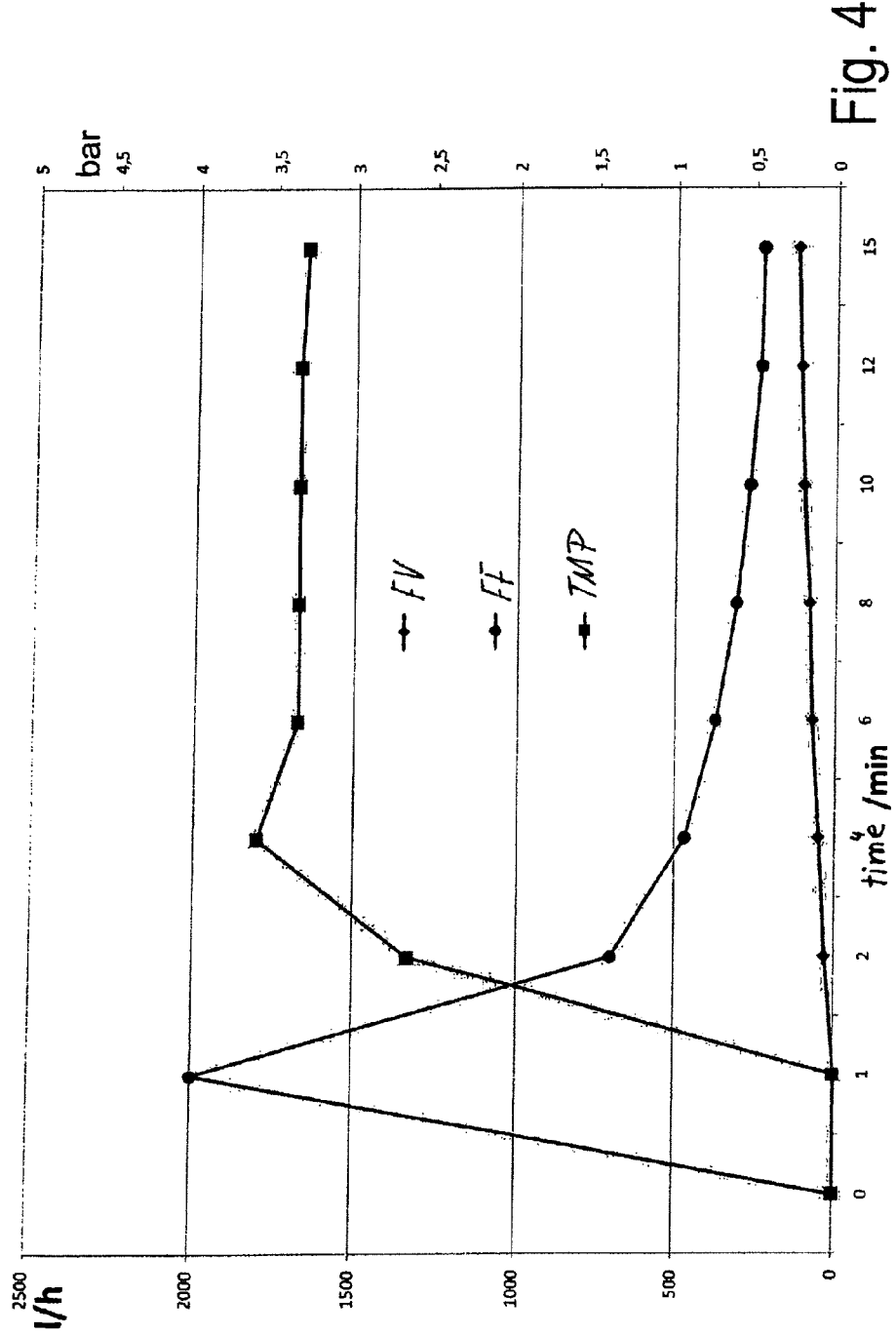
FIG. 4 shows an exemplary time curve of a filter volume, a filtrate flow, and a transmembrane pressure at the end of a filtration, in accordance with the present disclosure.

An advantage of the filtration system is reflected in FIGS. 3 and 4.

FIG. 3 illustrates the behavior during emptying of the system after 60 hL filtration, where FF=filtrate flow and TMP=transmembrane pressure.

FIG. 4 shows a corresponding emptying after 120 hL filtration, where FV=filtrate volume, FF=filtrate flow, and TMP=transmembrane pressure.

The two graphs of FIGS. 3 and 4 illustrate the pressing empty of the system using $CO_2$ to further decrease the losses in this manner. After the end of the filtration, a residual volume is still present in the system, which must be utilized. For this purpose, the system is pressed empty using inert gas. However, the flow collapses relatively rapidly due to the lack of the overflow. The graphs illustrate the pressing empty of the system after 4-5 hours filtration and after 10 hours, in order to simulate exhaustion of the filter. The graphs prove that pressing empty using gas is possible and within the scope of the present disclosure.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A filtration system for clarifying a cloudy beverage from at least one tank in which dregs have formed, the clarifying occurring through a cross-flow filtration, the filtration system comprising:
   a first filtration circuit including a first filtration module having a plurality of first filtration elements, wherein each of the plurality of first filtration elements has first channels with a first diameter less than 2 mm; and
   a second filtration circuit located in parallel to and fluidically coupled to the first filtration circuit, the second filtration circuit including a second filtration module having a plurality of second filtration elements, wherein each of the plurality of second filtration elements has second channels with a second diameter greater than 6 mm;
   wherein each of the plurality of first filtration elements and the plurality of second filtration elements have one or more bodies and wherein the one or more bodies are each penetrated by a plurality of respective first channels or second channels for conducting there-through the cloudy beverage to be clarified;
   wherein a number of the plurality of respective first channels in each body of the plurality of first filtration elements is not equal to a number of the plurality of respective second channels in each body of the plurality of second filtration elements.

2. The system according to claim 1, further comprising a valve for changing over between the first and second filtration circuit.

3. The system according to claim 1, further comprising one of a pump and a control unit configured to operate both filtration circuits.

4. The system according to claim 1, further comprising a supply line for a fluid.

5. The system according to claim 1, wherein a filtrate of the first filtration module and a filtrate of the second filtration module are discharged from the filtration system through a common discharge line.

6. The system according to claim 5, wherein a back-flushing unit is arranged on the common discharge line.

7. The system according to claim 1, wherein the plurality of first and second filtration elements are made of ceramic.

8. The system according to claim 1, wherein the plurality of first filtration elements includes a greater number of filtration elements than the plurality of second filtration elements.

9. A method for filtering a cloudy beverage from at least one tank in which dregs have formed, the method using the filtration system of claim 1 and the method steps comprising:
   clarifying the cloudy beverage in the first filtration circuit using the first filtration module including the plurality of first filtration elements and then discharging the clarified beverage; and
   clarifying any remaining unfiltered material or the dregs from the clarifying step using the second filtration circuit using the second filtration module and using the at least one of the plurality of second filtration elements that has the second channel with the second diameter.

10. The system according to claim 4, wherein the fluid is an inert gas.

11. The system according to claim 1, wherein the one or more bodies are ceramic bodies.

* * * * *